3,389,190
CATALYST AND POLYMERISATION PROCESS
USING SAID CATALYST
Geoffrey Winton Alderson, James Keith Hambling, and Alan Arthur Yeo, Sunbury-on-Thames, England, assignors to The British Petroleum Company Limited, London, England, a joint-stock corporation of Great Britain
No Drawing. Filed Dec. 19, 1961, Ser. No. 160,625
Claims priority, application Great Britain, Dec. 19, 1960, 43,558/60; Oct. 31, 1961, 38,893/61
12 Claims. (Cl. 260—683.15)

This invention relates to an improved catalyst and a polymerisation process using said catalyst.

There is disclosed in U.K. patent specification No. 824,917 a process for the dimerisation of propylene in the presence of an alkali metal catalyst at a temperature of 100° F. to 400° F. and a pressure of from 1 to 100 atmospheres. Suitable alkali metals are said to include lithium, sodium, potassium, rubidium and caesium. It is further disclosed in the above patent that the alkali metal may be utilised as a film on an inert support, and there is therein illustrated the use of potassium on powdered potassium carbonate.

It is an object of the present invention to provide an improved catalyst. It is a further object to provide a method for the production of an improved alkali metal catalyst. It is a further object to provide an improved process for the polymerisation of a feedstock consisting of or comprising an olefinic hydrocarbon having at least three carbon atoms per molecule. Other objects will appear hereinafter.

Therefore the present invention provides a catalyst composition which comprises an elemental alkali metal having an atomic number less than 19 dispersed on an anhydrous potassium compound. In general such compositions are not active unless treated at elevated temperature, being preferably a temperature in excess of the melting point of the elemental alkali metal dispersed. This treatment may be incorporated in the method of obtaining the dispersions referred to above, or may be carried out subsequently.

Suitable potassium compounds are potassium hydroxide and potassium salts of mineral acids. Suitable potassium salts of mineral acids are silicate, sulphate and halides; the preferred salt is potassium carbonate.

Of the alkali metals commercially available, sodium is the most readily obtained and it is the preferred metal for deposition on the support material. If desired, however, lithium may be employed.

According to another aspect of the present invention there is provided a process for the production of a catalyst which comprises mixing a molten alkali metal having an atomic number less than 19, that is sodium or lithium, with an anhydrous potassium compound.

Preferably the molten sodium or lithium is stirred vigorously with the potassium compound in a finely divided form. Suitably the potassium compound will have a particle size less than 100 mesh B.S.S. Usually it is desirable to provide a blanket of an inert gas, e.g., nitrogen, whilst mixing is carried out.

The temperature at which the alkali metal is deposited on the potassium compound is not critical. Generally at temperatures nearer the melting point of the alkali metal, vigorous stirring is necessary for a longer period of time than when the elemental metal is applied at higher temperatures. The temperature will in general be chosen also having regard to any tendency of the potassium compound to decompose, melt or sinter. Preferably, conditions and potassium compound are chosen such that these phenomenon do not occur.

In general, sodium metal will be deposited on the potassium compound at a temperature of at least 250° C., preferably 250–500° C., the potassium compound being selected accordingly, and lithium metal will in general be deposited at a temperature not exceeding 225° C.

The amount of elemental metal employed is generally between 1 and 20% by weight of the potassium compound, preferably between 2 and 7% and more preferably between 4 and 6% by weight.

It is believed that under the conditions of catalyst preparation described hereinbefore metallic potassium is liberated in a highly dispersed state in the presence of sodium metal whereby a catalyst of greater polymerising activity is obtained than can be formed by the direct dispersion of potassium metal onto a support.

According to another aspect of the present invention an olefinic hydrocarbon having at least three carbon atoms per molecule is polymerised alone or with at least one other polymerisable or copolymerisable compound in contact with a catalyst as hereinbefore described.

Usually a preformed catalyst will be brought into contact with the olefinic hydrocarbon, but this is not essential if the polymerisation conditions are such that the catalyst will form in situ and in this case elemental sodium or lithium and a potassium compound or compounds as hereinbefore described may be brought into contact with the olefinic hydrocarbon.

The process of the invention is particularly suitable for the polymerisation of olefinic hydrocarbons having three or more carbon atoms, either alone or with at least one other polymerisable or copolymerisable compound, to low molecular weight products. Suitable feedstocks include propylene, isobutylene, butadiene and isoprene or mixtures of such compounds, or mixtures with ethylene. Alphaolefins are the preferred feedstocks.

The process is of particular value for effecting the dimerisation of propylene, the product usually containing a high proportion of 4-methylpentene-1.

Usually temperatures in the range 100° C. to 400° C., preferably 100–200° C., will be employed in order to effect the desirable polymerisation of mono-olefins and temperatures in the range −10° C. to 50° C. are suitable for polymerising dienes; the temperature being selected with regard to the ease of polymerisation of the selected monomer.

As stated hereinbefore, the process may be employed for the production of dimers in major proportion from propylene; in this case the preferred reaction temperature will be generally in the range 100° C. to 200° C. and preferably 130–180° C. Above 200° C. higher polymers are formed, for example at temperatures in the range 200° C. to 300° C., propylene trimer and tetramer may be obtained.

According to one embodiment of this invention there is provided a process for the production of 4-methylpentene-1 which comprises polymerising propylene in contact with a catalyst consisting of elemental sodium deposited on an anhydrous potassium compound, and recovering from the product a $C_6$ fraction consisting of or containing 4-methyl-pentene-1.

Usually the reaction pressure will be at least atmospheric, and may be up to 4000 lbs./sq. in. gauge. Preferably the pressure is between 1000 and 2500 p.s.i.g. and more particularly between 1400 and 1700 p.s.i.g.

The polymerisation may be carried out batchwise or in a continuous manner and in the latter instance space velocities between 0.5 and 10 v./v./hr. are preferred. The combination of polymerisation conditions employed will be selected according to the reactivity of the olefinic compound, the activity of the catalyst system and the nature of the product required.

The process may be carried out either in the presence or absence of a normally liquid solvent. Preferred solvents are hydrocarbons for example normally liquid paraffins of which n-heptane is particularly suitable.

The invention may be more clearly understood by reference to the following examples.

EXAMPLE 1

A catalyst was prepared by vacuum drying 75 grams of potassium carbonate of less than 100 mesh B.S.S. at 400° C. and 0.3 mm. of mercury, and adding thereto 3.5 grams of metallic sodium at 400° C. under a nitrogen blanket, the mixture being stirred vigorously for 30 minutes.

71 grams of the resulting catalyst, containing 0.09 gram atoms of free alkali metal was charged to an autoclave and propylene admitted to a pressure of 1700 p.s.i.g. The polymerisation reaction was carried out at 160° C. for 24 hours and the resulting hexene fraction distilled from the cooled products. 321 grams of hexenes were obtained representing approximately a 95% conversion of propylene and analysis by gas chromatography revealed the following composition:

|  | Percent by weight |
|---|---|
| 4-methylpentene-1 | 74.8 |
| 4-methylpentene-2 | 17.7 |
| 2-methylpentene-1 | 4.1 |
| 2-methylpentene-2 | 1.2 |
| n-Hexenes | 2.2 |

EXAMPLE 2

A catalyst was prepared by the method set out in Example 1 using potassium sulphate as the support material. 157.5 grams of the catalyst containing 21 gram atoms of free alkali metal was charged to an autoclave as in Example 1 and propylene added to a pressure of 1500 p.s.i.g. The polymerisation reaction was carried out at 160° C. for 18 hours and gave 100 grams of a hexene product having the following composition:

|  | Percent by weight |
|---|---|
| 4-methylpentene-1 | 73.4 |
| 4-methylpentene-2 | 16.8 |
| 2-methylpentene-1 | 4.5 |
| 2-methylpentene-2 | 2.2 |
| n-Hexenes | 3.1 |

EXAMPLE 3

This example is included for comparative purposes only and illustrates the lack of activity of catalyst compositions comprising elemental sodium deposited on support materials outside the scope of the present invention.

In each case the catalyst was prepared by vacuum drying the support material at 400° C./0.3 mm. mercury and depositing metallic sodium thereon at 400° C. The catalysts were charged to an autoclave and propylene added to a pressure of 1500 p.s.i.g. The reactor temperature was maintained at 160° C. and after 18 hours, in no case had reaction occurred.

The catalysts used in this example had the following compositions:

(a) 6.8% dispersion of metallic sodium on sodium carbonate
(b) 4.5% dispersion of metallic sodium on calcium carbonate
(c) 3% dispersion of metallic sodium on sodium sulphate

EXAMPLE 4

Catalyst consisting of varying amounts of metallic sodium on potassium carbonate were prepared according to the method set out in Example 1. Each catalyst was then used in a continuous process for the polymerisation of propylene in which the space velocity of the propylene was 1 v./v./hour, the pressure 1500 p.s.i.g., and the temperature was 160° C. The table below sets out the yields in grams of hexenes obtained per hour (1) per gram of free alkali metal on the potassium carbonate and (2) per litre of reactor space. The data illustrates the advantageous use of dispersions of sodium on potassium carbonate in the range of 2 to 7 and preferably 4 to 6 percent by weight.

| Percent dispersion of sodium | Yield per hr. per gm. atom of free alkali metal | Yield per hr. per litre of reactor space |
|---|---|---|
| 1 | 300 | 110 |
| 2 | 220 | 220 |
| 3 | 150 | 320 |
| 4½ | 130 | 340 |
| 6 | 100 | 340 |
| 8 | 90 | 310 |

EXAMPLE 5

This example is included for comparative purposes only. A series of catalysts comprising metallic potassium deposited on potassium carbonate, prepared in the manner set out in Example 1 and used in the polymerisation of propylene under the conditions set out in Example 4, gave a maximum yield of 65 grams hexenes per gram atom of free potassium. This result was obtained using an 8% dispersion of metallic potassium.

This shows by comparison with the second column of the above table that a catalyst obtained by dispersing potassium metal on potassium carbonate is much less active that a catalyst obtained by dispersing metallic sodium on potassium carbonate in promoting the polymerisation of propylene under analogous reaction conditions.

EXAMPLE 6

This example illustrates the use of a catalyst obtained by dispersing metallic sodium on potassium carbonate in the polymerisation of isobutylene.

The catalyst was prepared by dispersing 3.4 grams of metallic sodium on 91 grams of potassium carbonate, which had been vacuum dried at 400° C., by mixing thoroughly at 400° C.

The catalyst was charged to an autoclave and isobutylene added to a pressure of 1500 p.s.i.g. The reaction was carried out at 175° C. for 20 hours and gave 145 grams of a $C_8$ product which on analysis was shown to contain 82% by weight of 2,4,4-trimethyl-pentene-1 and 13% by weight of 2,4,4-trimethylpentene-2.

EXAMPLE 7

Sodium metal was dispersed on anhydrous potassium silicate at 360° C. to give a dispersion of 0.15 gram atoms of alkali metal per 100 grams of composition. 112.5 grams of the dispersion was placed in a 1 litre autoclave and propylene reacted in the presence thereof at 160° C. and 1500 p.s.i.g. After 18 hours 65.6 grams of hexenes were obtained which contained

|  | Percent by weight |
|---|---|
| 4-methylpentene-1 | 86.5 |
| 4-methylpentene-2 | 4.7 |
| 2-methylpentene-1 | 6.1 |
| 2-methylpentene-2 | 0.5 |
| n-Hexenes | 2.2 |

EXAMPLE 8

100 grams of potassium hydroxide was dried in 3 litre autoclave bomb at 400° C. and 0.1 mm. pressure for 2 hours, in which time 15% by weight of water was removed. 5% by weight of sodium metal was added to the potassium hydroxide, the bomb resealed and heated with shaking at 400° C. for 4 hours. Propylene was reacted in the presence of the catalyst so formed at 160° C. and 1800 p.s.i.g., and 45.6 grams of hexenes were obtained containing:

|  | Percent by weight |
|---|---|
| 4-methylpentene-1 | 76.9 |
| 4-methylpentene-2 | 10.8 |
| 2-methylpentene-1 | 6.7 |
| 2-methylpentene-2 | 1.1 |
| n-Hexenes | 1.4 |

EXAMPLE 9

Lithium was dispersed on dry potassium carbonate under an atmosphere of Argon at 250° C. A dispersion was obtained containing 0.06 gram atoms of alkali metal per 100 grams of composition. 57.6 grams of the dispersion was placed in a 1 litre autoclave and propylene reacted in the presence thereof at 150° C. and 1700 p.s.i.g. to obtain 40.4 grams of hexenes containing:

| | Percent by weight |
|---|---|
| 4-methylpentene-1 | 86.3 |
| 4-methylpentene-2 | 3.9 |
| 2-methylpentene-1 | 5.2 |
| 2-methylpentene-2 | 0.4 |
| n-Hexenes | 1.0 |

We claim:
1. A catalyst composition suitable for use in the polymerisation of olefinic hydrocarbons, consisting essentially of 1 to 20% by weight of sodium dispersed on anhydrous potassium carbonate.
2. A catalyst composition according to claim 1 which has been activated by being heated at an elevated temperature.
3. A catalyst composition according to claim 1 wherein 4-6% by weight of sodium metal is dispersed on anhydrous potassium carbonate.
4. A method of preparing a catalyst composition suitable for use in the polymerisation of olefinic hydrocarbons comprises mixing 1 to 20% by weight of molten sodium metal with anhydrous potassium carbonate.
5. A method according to claim 4 wherein the potassium compound is in finely divided form.
6. A method according to claim 5 wherein the molten sodium metal is mixed vigorously with anhydrous potassium carbonate at a temperature in the range 250° to 500° C. in an amount between 1 and 20% by weight based on the potassium carbonate.
7. A process for polymerising an olefinic hydrocarbon which comprises contacting an olefin having at least 3 carbon atoms per molecule with a catalyst consisting essentially of 1 to 20% by weight of elemental sodium dispersed on anhydrous potassium carbonate.
8. A process according to claim 7 wherein said olefin is a mono-olefin and the polymerisation is carried out at a temperature in the range 100°–400° C.
9. A process according to claim 7 wherein the olefin is a diene and the polymerisation is carried out at a temperature in the range −10° to 50° C.
10. A process for dimerising propylene which comprises contacting propylene with a catalyst consisting essentially of 1–20% by weight of sodium metal dispersed on anhydrous potassium carbonate at a temperature in the range 100° C. to 200° C.
11. A process for the production of 4-methylpentene-1 which comprises contacting propylene with a catalyst consisting essentially of 4 to 7% by weight of sodium metal dispersed on anhydrous potassium carbonate, at a temperature in the range 130°–180° C. and a pressure in the range 1000 to 2500 p.s.i.g., and recovering from the product a $C_6$ fraction consisting essentially of 4-methylpentene-1.
12. A process for the production of 4-methylpentene-1 which comprises contacting propylene with a catalyst consisting essentially of sodium metal and potassium carbonate.

References Cited

UNITED STATES PATENTS

| 2,986,588 | 5/1961 | Schramm | 260—683.15 |
| 3,006,976 | 10/1961 | Shaw et al. | 260—683.15 |
| 3,028,441 | 4/1962 | Bush et al. | 260—683.15 |
| 3,104,271 | 9/1963 | Lindsay | 260—683.15 |
| 3,185,745 | 5/1965 | Lindsay | 260—683.15 |
| 3,207,812 | 9/1965 | Hambling et al. | 260—683.15 |
| 3,255,272 | 6/1966 | Lindsay | 260—683.15 |
| 3,278,632 | 11/1966 | Hambling et al. | 260—683.15 |

OTHER REFERENCES

Rinck, Chemical Abstracts, vol. 27, 1933, pages 1806–1807.

PAUL M. COUGHLAN, JR., *Primary Examiner.*

ALPHONSO SULLIVAN, *Examiner.*